(12) United States Patent
Liu et al.

(10) Patent No.: US 6,815,054 B1
(45) Date of Patent: Nov. 9, 2004

(54) ULTRA-THIN, CORROSION RESISTANT, HYDROGENATED CARBON OVERCOATS BY COMBINED SPUTTERING AND PECVD

(75) Inventors: Wen Hong Liu, San Jose, CA (US); Yao-Tzung Roger Shih, Cupertino, CA (US); Taesun Ernest Kim, San Jose, CA (US); Chung Yuang Shih, Cupertino, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 85 days.

(21) Appl. No.: 09/986,863

(22) Filed: Nov. 13, 2001

Related U.S. Application Data
(60) Provisional application No. 60/308,146, filed on Jul. 26, 2001.

(51) Int. Cl.[7] ................................................. G11B 5/72
(52) U.S. Cl. ................ 428/336; 428/408; 428/694 TC; 428/65.5
(58) Field of Search ................................. 428/336, 408, 428/694 TC, 65.5

(56) References Cited
U.S. PATENT DOCUMENTS

| | | | |
|---|---|---|---|
| 5,869,186 A | * | 2/1999 | Usuki et al. ................ 428/421 |
| 6,086,962 A | * | 7/2000 | Mahoney et al. ........... 427/577 |
| 6,358,636 B1 | * | 3/2002 | Yang et al. ............. 428/694 TP |

* cited by examiner

Primary Examiner—Stevan A. Resan
(74) Attorney, Agent, or Firm—McDermott Will & Emery LLP

(57) ABSTRACT

A method of forming a layer of a hard, abrasion, and corrosion-resistant hydrogenated carbon (C:H) material on a substrate surface comprises steps of:

(a) providing a vacuum chamber including a carbon sputtering target in the interior space thereof;

(b) providing a substrate in the chamber interior space, a surface of the substrate the sputtering target;

(c) supplying the vacuum chamber with at least one hydrocarbon gas and at least one inert gas at separately controllable flow rates and applying a sufficient negative potential to the carbon target to generate a plasma in said interior space to deposit a layer of the C:H material on the substrate surface by a process comprising simultaneous sputtering of the carbon sputtering target and plasma enhanced chemical vapor deposition (PECVD) of carbon and hydrogen from the hydrocarbon gas, wherein:

step (c) includes separately controlling the flow rates of each of the hydrocarbon and inert gases such that the amount of C atoms in the C:H which are contributed by the PECVD component of the process is less than about 50 at. %.

Embodiments of the invention include utilizing the C:H material as a protective overcoat layer for magnetic and magneto-optical recording media.

14 Claims, 3 Drawing Sheets

ULTRA-THIN, CORROSION RESISTANT, HYDROGENATED CARBON OVERCOATS BY COMBINED SPUTTERING AND PECVD

CROSS-REFERENCE TO PROVISIONAL APPLICATION

This application claims priority from U.S. provisional patent application Ser. No. 60/308,146 filed Jul. 26, 2001, the entire disclosure of which is incorporated herein by reference.

FIELD OF THE INVENTION

The present invention relates to a novel hard, highly abrasion and corrosion-resistant, hydrogenated carbon material useful as an ultra-thin protective overcoat layer for high areal recording density thin film magnetic and magneto-optical ("MO") recording media, a method of depositing films or layers of the novel material, and to improved magnetic and MO media including a protective overcoat layer comprised of the novel material.

BACKGROUND OF THE INVENTION

A magnetic recording medium, e.g., a hard disk, typically comprises a laminate of several layers, comprising a non-magnetic substrate, such as of Al—Mg alloy or a glass or glass-ceramic composite material, and formed sequentially on each side thereof, a polycrystalline underlayer, typically of chromium (Cr) or Cr-baed alloy, a polycrystalline magnetic recording medium layer, e.g., of a cobalt (Co)-based alloy, a hard, abrasion-resistant, protective overcoat layer, typically containing carbon (C), and a lubricant topcoat.

In operation of the magnetic recording medium, the polycrystalline magnetic recording medium layer is locally magnetized by a write transducer, or write head, to record and store information. The write transducer creates a highly concentrated magnetic field which alternates direction based on the bits of information being stored. When the local magnetic field produced by the write transducer is greater than the coercivity of the recording medium layer, then the grains of the polycrystalline recording medium at that location are magnetized. The grains retain their magnetization after the magnetic field produced by the write transducer is removed. The direction of the magnetization matches the direction of the applied magnetic field. The magnetization of the polycrystalline recording medium can subsequently produce an electrical response in a read transducer, allowing the stored information to be read.

Thin film magnetic recording media are conventionally employed in disk form for use with disk drives for storing large amounts of data in magnetizable form. Typically, one or more disks are rotated on a central axis in combination with data transducer heads. In operation, a typical contact start/stop (CSS) method commences when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions, allowing data to be recorded on and retrieved from the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the static position, and during deceleration just prior to completely stopping. Each time the head and disk assembly is driven, the sliding surface of the head repeats the cyclic sequence consisting of stopping, sliding against the surface of the disk, floating in the air, sliding against the surface of the disk, and stopping.

As a consequence of the above-described cyclic CSS-type operation, the surface of the disk or medium surface wears off due to the sliding contact if it has insufficient abrasion resistance or lubrication quality, resulting in breakage or damage if the medium surface wears off to a great extent, whereby operation of the disk drive for performing reading and reproducing operations becomes impossible. The protective overcoat layer is formed on the surface of the polycrystalline magnetic recording medium layer so as to protect the latter from friction and like effects due to the above-described sliding action of the magnetic head. Abrasion-resistant, carbon (C)-containing protective coatings have been utilized for this purpose, and are typically formed by sputtering of a carbon target in an argon (Ar) atmosphere. Such amorphous carbon (a-C)-containing protective overcoat layers formed by sputtering have relatively strong graphitic-type bonding, and therefore exhibit a low coefficient of friction in atmospheres containing water ($H_2O$) vapor, which characteristic is peculiar to graphite. However, the a-C layers produced in such manner have very low hardness as compared with many ceramic materials such as are employed as slider materials of thin film heads, and thus are likely to suffer from wear due to contact therewith.

In recent years, therefore, carbon-based protective overcoat layers having diamond-like hardness properties (i.e., HV of about 1,000–5,000 $kg/mm^2$) have been developed, and films of diamond-like carbon (DLC) having a high percentage of diamond-type C—C bonding have been utilized. Such DLC films exhibit a high degree of hardness due to their diamond-like $sp^3$ bonding structure, and in addition, exhibit the excellent sliding properties characteristic of carbon, thus affording improved sliding resistance against sliders composed of high hardness materials. Such DLC films are generally obtained by DC or RF magnetron sputtering of a carbon target in a gas atmosphere comprising a mixture of Ar gas and a hydrocarbon gas, e.g., methane, or hydrogen gas. The thus-obtained films exhibit DLC properties when a fixed amount of hydrogen is incorporated therein. Incorporation of excessive amounts of hydrogen in the films leads to gradual softening, and thus the hydrogen content of the films must be carefully regulated.

Amorphous, hydrogenated carbon films (referred to herein as a-C:H films) obtained by sputtering of carbon targets in an Ar+$H_2$ gas mixture exhibiting diamond-like properties have also been developed for improving the tribological performance of disk drives; however, the electrical insulating properties of such type films lead to undesirable electrical charge build-up or accumulation during hard disk operation which can result in contamination, glide noise, etc. In order to solve this problem without sacrifice or diminution of the advantageous mechanical properties of such a-C:H films, attempts have been made to dope or otherwise incorporate nitrogen (N) atoms into the a-C:H films, in view of a substantial decrease in electrical resistivity and optical band gap ($E_{BG}$) exhibited by such nitrogen-doped a-C:H films relative to undoped films.

However, the continuous increase in areal recording density of magnetic recording media requires a commensurately lower flying height. Therefore, it would be advantageous to reduce the thickness of the carbon-based protective overcoat layer without adverse consequences. Conventional sputtered a-C:H materials are difficult to uniformly deposit and generally do not function satisfactorily at a thickness of about 30 Å or less. Specifically, conventional sputtered a-C:H films of about 30 Å thickness fail to provide adequate protection against corrosion of the underlying magnetic layer(s), particularly Co-containing ferromagnetic layers, when under environments of high temperature and humidity, and the resulting corrosion product(s) frequently are disadvantageously transferred to the transducer heads, often leading to failure of the disk drive.

The use of alternative deposition techniques for developing thinner and harder a-C:H layers having the requisite mechanical and tribological properties has been studied, such as chemical vapor deposition (CVD), ion beam deposition (IBD), and cathodic arc deposition (CAD) techniques. For example, the IBD method can be utilized for forming hydrogenated ion-beam carbon films (referred to herein as i-C:H films) that exhibit superior tribological performance at thicknesses below about 100 Å. However, such films are insulating and, thus, suffer from the above-described drawback of electrical charge build-up during hard disk operation associated with sputtered a-C:H films.

Accordingly, there exists a need for an improved hard, abrasion and corrosion-resistant material particularly suitable for use as an ultra-thin protective overcoat layer in high areal density magnetic recording media, and a method for manufacturing same, which method is simple, cost-effective, and fully compatible with the productivity and throughput requirements of automated manufacturing technology.

The present invention fully addresses and solves the above-described problems attendant upon the formation of ultra-thin, abrasion and corrosion-resistant protective overcoat layers suitable for use with high areal density magnetic recording media, such as are employed in hard drive applications, while maintaining full compatibility with all mechanical and electrical aspects of conventional disk drive technology. In addition, the present invention enjoys utility in the formation of ultra-thin, abrasion and corrosion-resistant protective overcoat layers required in the manufacture and use of thin film-based, ultra-high recording density magneto-optical (MO) data/information storage and retrieval media in disk form and utilizing conventional Winchester disk drive technology with laser/optical-based read/write transducers operating at flying heights on the order of a few micro-inches above the media surface.

DISCLOSURE OF THE INVENTION

An advantage of the present invention is an improved hard, abrasion and corrosion-resistant, hydrogenated carbon ("C:H") material formed by a simultaneous sputter+plasma enhanced chemical vapor deposition ("PECVD") process.

Another advantage of the present invention is an improved protective overcoat material for magnetic and MO recording media and comprising an improved hard, abrasion and corrosion-resistant, sputter+PECVD-deposited C:H material.

Yet another advantage of the present invention is an improved magnetic or MO recording medium including an ultra-thin protective overcoat layer comprised of a sputter+PECVD-deposited C:H material.

Still another advantage of the present invention is an improved simultaneous sputter+PECVD method for forming C:H films or layers suitable for use as ultra-thin, abrasion and corrosion-resistant protective overcoat materials in magnetic and MO recording media applications.

A further advantage of the present invention is an improved method for regulating or controlling the amount of PECVD-derived carbon (C) atoms contained in sputter+PECVD deposited C:H materials, films or layers.

A still further advantage of the present invention is an improved apparatus for performing simultaneous sputtering+PECVD for forming films or layers of the improved C:H materials according to the present invention.

Still another advantage of the present invention is an improved magnetic recording medium comprising at least one ferromagnetic layer containing Co and means for protecting the at least one Co-containing ferromagnetic layer from corrosion under high temperature, high humidity conditions.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to one aspect of the present invention, the foregoing and other advantages are obtained in part by a novel hard, abrasion and corrosion-resistant material useful as an ultra-thin protective overcoat layer for a magnetic or magneto-optical (MO) recording medium, which novel material comprises hydrogenated carbon (C:H) formed by a process comprising simultaneous sputter and plasma-enhanced chemical vapor deposition (PECVD) of the hydrogenated carbon (C:H), wherein the amount of carbon atoms in the novel C:H material derived from the PECVD component of the process is less than about 50 at. %.

According to certain embodiments of the present invention, the amount of carbon atoms in the novel C:H material derived from the PECVD component of the process is at least about 30 at. %; the position of the Raman G-band of the C:H material is about 1553 $cm^{-1}$; and the film resistance of the C:H material is as high as about 85 k $\Omega$.

Another aspect of the present invention is a magnetic or MO recording medium comprising a protective overcoat layer formed of the novel C:H material; and according particular embodiments of the present invention, the thickness of the protective overcoat layer is not greater than about 30 Å.

Yet another aspect of the present invention is a method of forming a layer of a novel hard, abrasion, and corrosion-resistant hydrogenated carbon (C:H) material on a surface of a substrate, which method comprises the steps of:

(a) providing a vacuum chamber including a carbon sputtering target in the interior space thereof;

(b) providing a substrate in the interior space of the chamber, such that a surface of the substrate is in facing relation to the sputtering target;

(c) supplying the interior space of the vacuum chamber with at least one hydrocarbon gas and at least one inert gas at separately controllable flow rates and applying a sufficient negative potential to the carbon sputtering target to generate a plasma in the interior space to deposit a layer of a novel hard, abrasion and corrosion-resistant C:H material on the substrate surface by simultaneous sputtering of the carbon sputtering target and plasma enhanced chemical vapor deposition (PECVD) of carbon and hydrogen from the at least one hydrocarbon gas, wherein:

step (c) includes separately controlling the flow rates of each of the hydrocarbon and inert gases supplied to the vacuum chamber such that the amount of carbon atoms in the layer of C:H which are derived from PECVD of the hydrocarbon gas is less than about 50 at. %.

In accordance with embodiments of the present invention, step (c) includes separately controlling the flow rates of each of the hydrocarbon and inert gases to the vacuum chamber such that the amount of carbon atoms in the layer of C:H which are derived from PECVD of the at least one hydrocarbon gas is at least about 30 at. %; step (c) further includes supplying the interior space of the vacuum chamber with at least one hydrocarbon gas of formula $C_xH_y$, where x=an integer from 1 to 5 and y=an integer from 2 to 10 and at least one inert gas selected from the group consisting of He, Ne, Ar, Kr, and Xe.

According to particular embodiments of the present invention, step (c) includes supplying the interior space of the vacuum chamber with at least one of acetylene ($C_2H_2$) and ethylene ($C_2H_4$) as the at least one hydrocarbon gas and Ar as the at least one inert gas; step (a) comprises providing an elongated, cylindrical carbon sputtering target rotatable about its axis of elongation; step (c) further comprises rotating the cylindrical carbon sputtering target about the axis of elongation; and step (b) further comprises applying a bias voltage within the voltage range from 0 to about −150 V to the substrate during step (c).

Embodiments of the present invention include comprises providing a magnetic or magneto-optical (MO) recording medium as the substrate in step (b), the surface thereof comprising the exposed surface of an uppermost layer of a stack of layers comprising the medium; and step (c) comprises forming a protective overcoat layer of the hard, abrasion and corrosion-resistant C:H on the exposed surface of the uppermost layer of the medium.

According to particular embodiments of the present invention, step (b) comprises providing a disk-shaped substrate; and step (c) comprises forming the protective overcoat layer to a thickness not greater than about 30 Å.

Still another aspect of the present invention is a recording medium, comprising:

(a) a substrate;

(b) a stack of thin film layers on the substrate; and (c) a protective overcoat layer on an uppermost layer of the stack of thin film layers, the protective overcoat layer comprising a novel hard, abrasion and corrosion-resistant material comprised of hydrogenated carbon (C:H) formed by a process comprising simultaneous sputter and plasma-enhanced chemical vapor (PECVD) deposition of the novel hydrogenated carbon (C:H) material, wherein the amount of carbon atoms in the C:H material derived from the PECVD component of the process is less than about 50 at. %.

According to embodiments of the present invention, the amount of carbon atoms in the C:H material derived from the PECVD component of the process is at least about 30 at. %; the position of the Raman G-band of the C:H material of the protective overcoat layer is about 1553 $cm^{-1}$; and the film resistance is as high as about 85 k $\Omega$.

In accordance with particular embodiments of the present invention, the stack (b) of thin film layers comprises a stack of layers for a magnetic or magneto-optical (MO) recording medium; and the substrate (a) is disk-shaped.

According to specific embodiments of the invention, the stack (b) of thin film layers comprises a stack of layers for a magnetic recording medium; the protective overcoat layer (c) is not greater than about 30 Å thick; and the stack (b) of thin film layers includes at least one ferromagnetic layer comprising Co.

A further aspect of the present invention is an apparatus for performing simultaneous sputter and plasma-enhanced chemical vapor (PECVD) deposition of a layer of a novel hard, abrasion and corrosion-resistant, hydrogenated carbon (C:H) material on a surface of a substrate, comprising:

(a) a vacuum chamber defining an interior space;

(b) a carbon sputtering target in the interior space of the vacuum chamber, the carbon target being in the form of an elongated cylinder rotatable about its axis of elongation;

(c) substrate mounting means for mounting a substrate in the interior space of the vacuum chamber, such that a major surface of the substrate is in parallel, facing relation to the elongated cylinder sputtering target; and (d) gas supply means for supplying the interior space of the vacuum chamber with at least one hydrocarbon gas and at least one inert sputtering gas at separately controllable flow rates.

According to embodiments of the present invention, substrate mounting means (c) comprises means for mounting a disk-shaped substrate such that a major surface thereof is in parallel, facing relation to the cylindrical sputtering target; and the apparatus further comprises a bias voltage applying means (e) for applying to the substrate a bias voltage within the range from 0 to about −150 V.

A still further aspect of the present invention is a magnetic recording medium, comprising:

(a) at least one ferromagnetic thin film layer containing Co; and (b) means for protecting the at least one Co-containing ferromagnetic thin film layer from corrosion under high temperature, high humidity environments.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the pertinent features are not necessarily drawn to scale but rather are drawn as to best illustrate the pertinent features, wherein.

DESCRIPTION OF THE INVENTION

The present invention addresses and solves problems attendant upon the formation of ultra-thin, abrasion and corrosion-resistant protective overcoat layers suitable for use with high areal density magnetic recording media, such as are employed in hard drive applications, while maintaining full compatibility with all mechanical and electrical aspects of conventional disk drive technology. In addition, the present invention enjoys utility in the formation of ultra-thin, abrasion and corrosion-resistant protective overcoat layers required in the manufacture and use of thin film-based, ultra-high recording density magneto-optical (MO) data/information storage and retrieval media in disk form and utilizing conventional Winchester disk drive technology with laser/optical-based read/write transducers operating at flying heights on the order of a few micro-inches above the media surface.

Specifically, the present invention is based, in part, upon recognition that novel hard, abrasion resistant hydrogenated carbon (C:H) films and layers, suitable for use as ultra-thin, protective overcoat layers of thin film magnetic and MO recording media, and exhibiting superior properties vis-a-vis similar C:H films and layers obtained by conventional sputtering techniques, can be rapidly, conveniently, and cost-effectively formed by a process involving performing simultaneous sputter and plasma enhanced chemical vapor deposition (PECVD) of the C:H films utilizing a carbon (C) sputtering target and a gas atmosphere comprising at least one inert sputtering gas and at least one hydrocarbon gas, wherein the amount of C atoms in the deposited C:H film or layer derived from the PECVD component of the process is at least about 30 at. % but less than about 50 at. %. The present invention is further based, in part, upon recognition that disadvantageous deposition of electrically insulative hydrocarbon material on the surface of the carbon sputtering target leading to undesirable arcing on the surface of the target, which in turn, incurs damage to the surface of the C:H layer deposited on the substrate and results in a reduction in product yield, can be effectively eliminated, or at least minimized, by limiting the amount of carbon atoms in the C:H films contributed by the PECVD component of the process to less than about 50 at. %. Another advantageous feature of the present invention leading to a further reduction in undesirable arcing arising from formation of a non-conductive hydrocarbon layer on the surface of the carbon target, is the use of a simultaneous sputter+PECVD apparatus comprising an elongated, cylindrical rod-shaped carbon target which rotates at about 2–30 rpm about its axis of elongation during sputtering therefrom.

Figure 1:
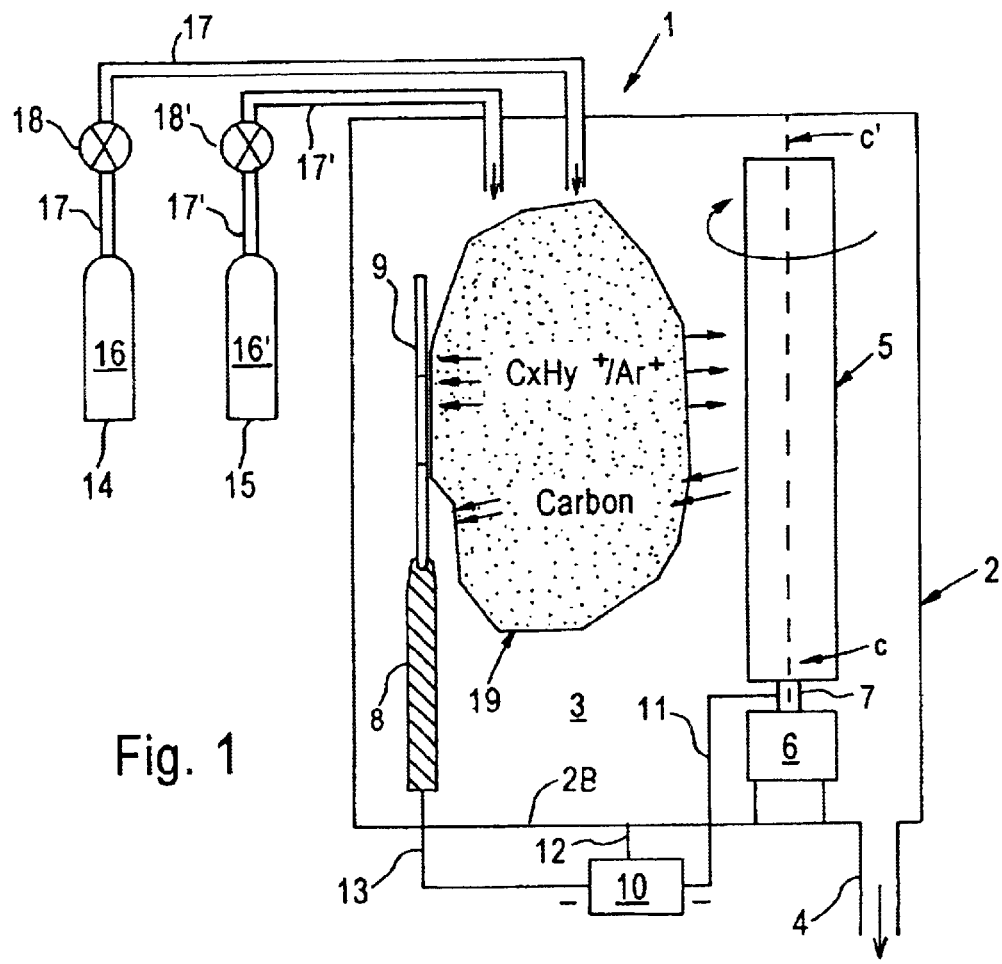
FIG. 1 is a simplified, schematic cross-sectional view of an exemplary embodiment of an apparatus for performing the simultaneous sputtering+PECVD process according to the present invention.

Referring now to FIG. 1, illustrated therein in simplified, cross-sectional view, is an exemplary, but non-limiting, embodiment of an apparatus 1 for performing the simultaneous sputtering+PECVD C:H deposition process of the present invention. As shown, sputtering+PECVD apparatus 1 comprises a vacuum chamber 2 defining an interior space 3, with at least the bottom wall 2B of chamber 2 being formed of an electrically conductive material (e.g., stainless steel) and therefore adapted to serve as an anode, and including an outlet port 4 operatively connected to a suitable vacuum pump means (not shown in the drawing for illustrative simplicity) for evacuating the interior space 3 to a desired level of vacuum. Mounted within the interior space 3 of chamber 2 is an elongated, cylindrical rod-shaped cathode 5, at least the exterior surface of which is formed of carbon (C), typically graphitic carbon. Cathode 5 is rotatable about its axis of elongation c–c' by means of motor 6 and shaft 7 operatively connected thereto. Mounted in facing relation to cathode 5, as by means of an electrically conductive mounting means 8, is an electrically conductive substrate 9, e.g., an Al-based annular disk-shaped substrate for a hard disk recording medium. DC power supply 10 is electrically connected to the carbon cathode 5 and the chamber bottom wall 2B (anode) via electrical leads 11 and 12, respectively, and to the substrate mounting means 8 via lead 13 for supplying a bias voltage to substrate 9. By way of illustration, but not limitation, carbon target 5 may comprise a 6" diameter graphite rod about 36" long, spaced about 5" away from an Al-based, annular disk-shaped substrate 9 having inner and outer diameters of 10–22 and 65–95 mm, respectively. Typical rotation speeds of the carbon target 5 during operation of apparatus 1 are in the range from about 2 to about 30 rpm, with bias voltages applied to substrate 9 via power supply 10, electrical lead 13, and mounting means 8 in the range from about 0 to about −150 VDC.

At least a pair of gas supply means 14 and 15, each comprised of a respective gas source 16, 16', conduit 17, 17', and valve+gas flow regulator means 18, 18' are provided for supplying chamber 1 with independently controllable and regulatable flows of at least one inert sputtering gas, and at least one hydrocarbon gas $C_xH_y$, where x and y are each integers from 1 to 5 and from 2 to 10, respectively. By way of illustration, but not limitation, the at least one hydrocarbon gas may comprise acetylene ($C_2H_2$) and/or ethylene ($C_2H_4$), and the at least one inert sputtering gas may be one or more of He, Ne, Ar, Xe, and Kr, typically Ar.

In operation of sputtering+PECVD apparatus 1, interior space 3 of vacuum chamber 2 is evacuated to a suitable vacuum by means of outlet port 4+vacuum pump means, and inert and hydrocarbon gases supplied thereto at independently regulated, desired flow rates by means of gas supply means 14 and 15. An ionized plasma (schematically indicated in FIG. 1 by shaded area 19) is generated within the interior space 3 upon application of a suitable negative potential to the carbon cathode 5 via electrical lead 11 connected to a negative polarity output of power supply 10, with the bottom wall 2B of chamber 2 being electrically connected to a positive polarity or electrically grounded output of power supply 10 via electrical lead 12. As illustrated, positively charged Ar ions generated in the plasma are accelerated to and bombard the surface of carbon target 5 to eject (i.e., sputter) C atoms therefrom, which sputtered C atoms travel towards substrate 9 for deposition thereon. Simultaneous with the deposition of sputtered C atoms on the surface of substrate 9, C and H atoms derived from molecules of hydrocarbon gas $C_xH_y$ supplied to the plasma by one of the gas supply means 14 or 15 are also deposited on the surface of substrate 9 via a plasma-enhanced chemical vapor deposition (PECVD) process. According to the invention, the elongated cylinder-shaped carbon target 5 is rotated (typically at about 2–30 rpm) about its axis of elongation, c–c' during the simultaneous sputtering+PECVD operation of apparatus 1 in order to aid in eliminating, or at least minimizing, disadvantageous deposition of electrically insulating hydrocarbon deposits thereon, which non-conductive deposits frequently lead to arc generation in the plasma which, in turn, can result in damage to the surface of the deposited C:H layer (i.e., defect formation) and reduced product yield.

Another key feature of the present invention, which substantially reduces the deposition of electrically insulating hydrocarbon layers on the target surface, and thus eliminates, or at least substantially reduces, the frequency of arcing leading to defect formation in the surface of the C:H films formed on the surface of substrate 9, is limiting the amount of C atoms in the C:H films derived from the PECVD component of the process. Specifically, when the amount of C atoms derived from the PECVD component of the simultaneous sputter+PECVD process is less than about 50 at. %, no net deposition of non-conductive hydrocarbon material occurs on the target surface. As a consequence, the frequency or likelihood of arcing is dramatically decreased when the PECVD contribution of C atoms to the deposited film is kept below about 50 at. %. This key feature of the invention is readily implemented by means of appropriate regulation and adjustment of the sputtering power applied to the target 5 or by independent regulation of the flow rates of each of the inert sputtering and hydrocarbon gases supplied to the vacuum chamber 2 by the gas supply means 14, 15. Finally, additional control/regulation of the resultant film properties is obtained by applying a negative polarity DC bias in the range from 0 to about –150 V to substrate 9 during simultaneous sputter+PECVD deposition of the C:H layer thereon. Application of the DC substrate bias is accomplished via power supply 10 and associated electrical lead 13 and substrate mounting means 8.

Figure 2:
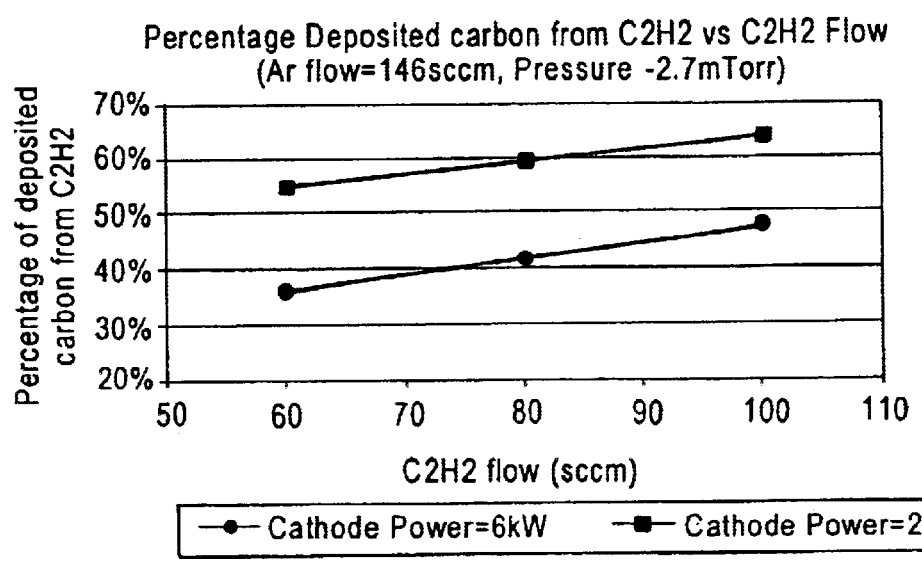
FIG. 2 is a graph for illustrating the variation of the amount (in at. %) of C atoms in C:H films derived from PECVD of acetylene ($C_2H_2$) gas when the C:H films are formed by the simultaneous sputtering+PECVD method of the invention, as a function of the flow rate of $C_2H_2$ gas to the vacuum chamber, at constant Ar flow rate and pressure, for two different cathode power levels.

FIG. 2 is a graph for illustrating the variation of the amount (in at. %) of C atoms in C:H films derived from PECVD of acetylene ($C_2H_2$) gas when the C:H films are formed by the simultaneous sputtering+PECVD method of the invention, as a function of the flow rate of $C_2H_2$ gas to the vacuum chamber, at constant Ar flow rate and pressure, for two different cathode power levels. As is evident from FIG. 2, the amount of C atoms contributed to the resultant C:H films by the PECVD component can be adjusted/regulated by appropriate variation of the hydrocarbon ($C_xH_y$) gas flow (i.e., acetylene, $C_2H_2$) or by appropriate selection of the sputtering power applied to the target. As for the former option, an increase in the $C_xH_y$ gas flow at a fixed inert gas (i.e., Ar) flow and chamber pressure will result in an increase in the PECVD contribution of C atoms to the deposited films. As for the latter option, for a given $C_xH_y$ flow rate, an increase in the power applied to the cathode (i.e., carbon sputtering target) results in a decrease in the PECVD contribution of C atoms to the deposited films, i.e., an increase in the sputter contribution of C atoms to the deposited films.

Figure 3:
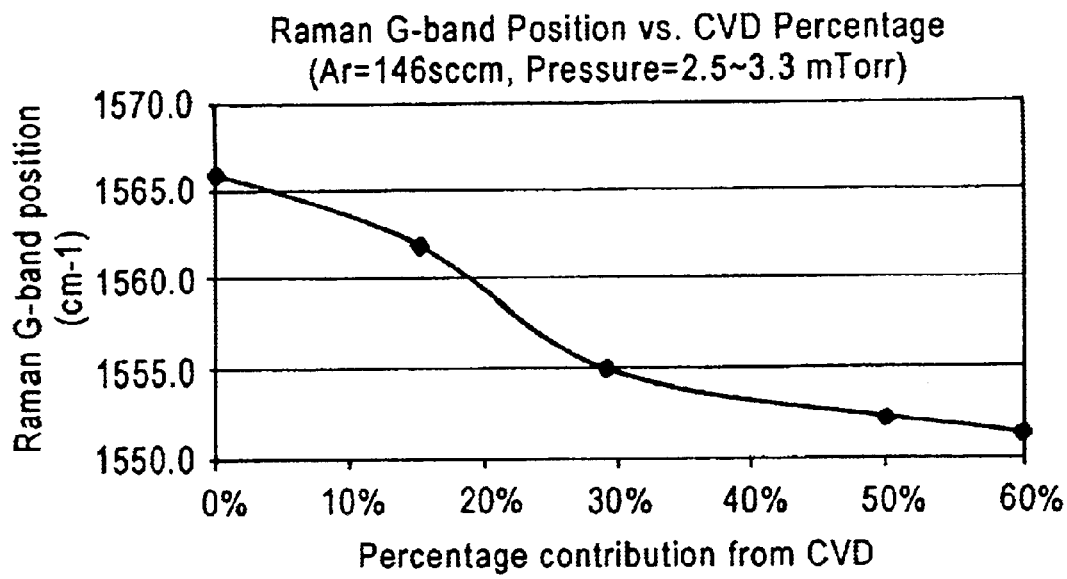
FIG. 3 is a graph for illustrating the variation of the position of the Raman G-band of C:H films formed by the simultaneous sputtering+PECVD method of the invention, as a function of the amount of C atoms (in at. %) contributed by the PECVD component of the deposition process.
Figure 4:
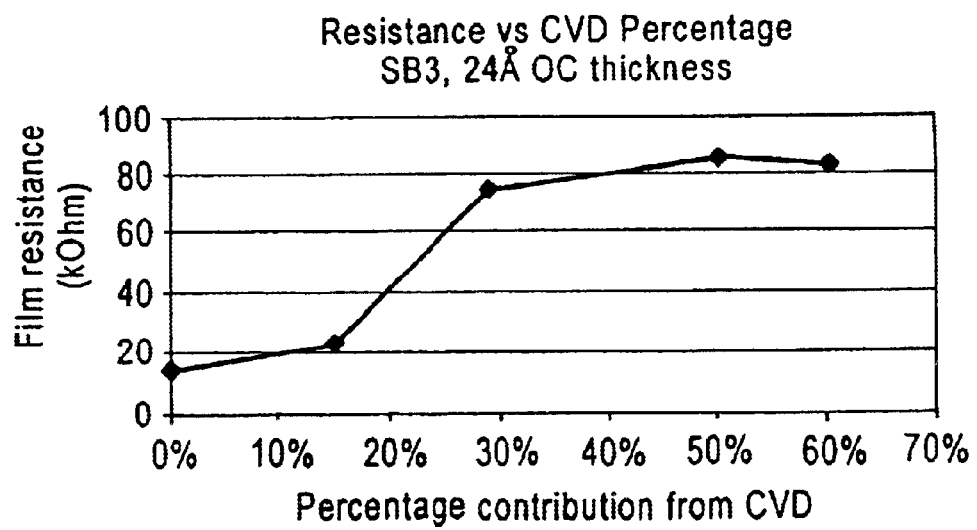
FIG. 4 is a graph for illustrating the variation of the resistance of C:H films formed by the simultaneous sputtering+PECVD method of the invention, as a function of the amount of C atoms (in at. %) contributed by the PECVD component of the deposition process.

FIG. 3 is a graph for illustrating the variation of the position of the Raman G-band of C:H films formed by the simultaneous sputtering+PECVD method of the invention, as a function of the amount of C atoms (in at. %) contributed by the PECVD component of the deposition process (at a fixed Ar flow rate); and FIG. 4 is a graph for illustrating the variation of the resistance of 25 Å thick C:H films formed by the simultaneous sputtering+PECVD method of the invention, as a function of the amount of C atoms (in at. %) contributed by the PECVD component of the deposition process. As is apparent from these figures, the C:H film properties may be varied by adjusting the C atom contribution from the PECVD component of the process. For example, FIG. 3 shows that the position of the Raman G-band is lowered as the % C atom contribution from the PECVD component increases to about 50 at. %, thereby indicating that the films have an increased amount of diamond-like SP bonding providing increased hardness; and FIG. 4 indicates that the film resistance increases with increased % C atom contribution from the PECVD component of the process, up to about 50 at. %, with further increase in % C atom contribution from the PECVD component of the process not resulting in any further increase in film resistance. In either instance, it is apparent that the % C atom contribution from the PECVD component of the process should not exceed about 50 at. %.

Figure 5:
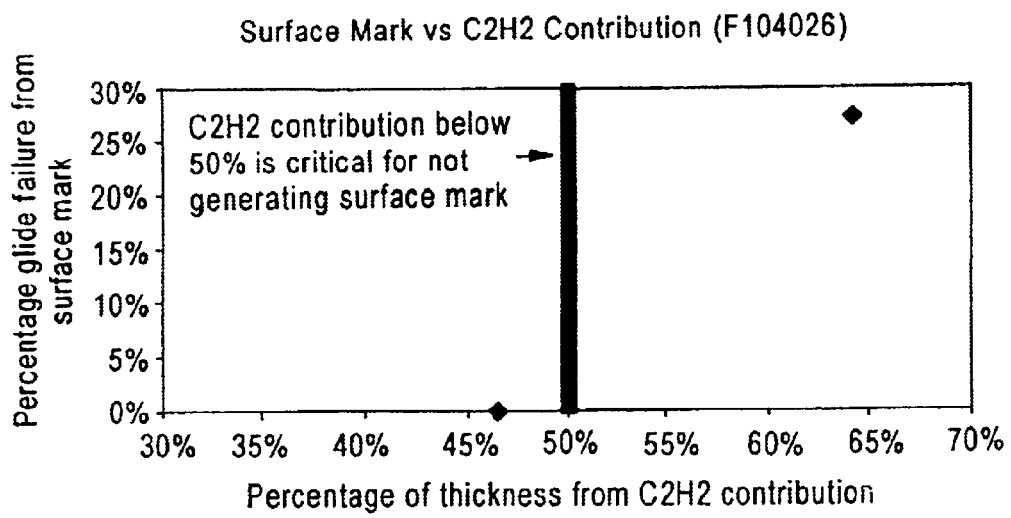
FIG. 5 is a graph for illustrating the variation of the % glide failure due to surface marks of C:H films formed by the simultaneous sputtering +PECVD method of the invention, as a function of the % thickness of the C:H films contributed by the PECVD component of the deposition process.

FIG. 5 is a graph for illustrating the variation of the % glide failure due to surface marks of C:H films formed by the simultaneous sputtering+PECVD method of the invention, as a function of the % thickness of the C:H films contributed by the PECVD component of the deposition process. As indicated above, when the contribution of C atoms to the C:H films from the PECVD component exceeds about 50 at. %, a net deposition of non-conductive hydrocarbon will occur on the surface of the carbon target, leading to arcing which tends to introduce defects in the surface of the C:H layer deposited on the substrate (i.e., media) surface. Such defects are termed "surface marks". As is clearly evident from FIG. 5, it is critical for obtainment of 0% glide failures due to presence of such surface marks that the percentage of the film thickness attributed to the C atom contribution to the C:H films from the PECVD component of the process be limited to less than 50%.

Figure 6:
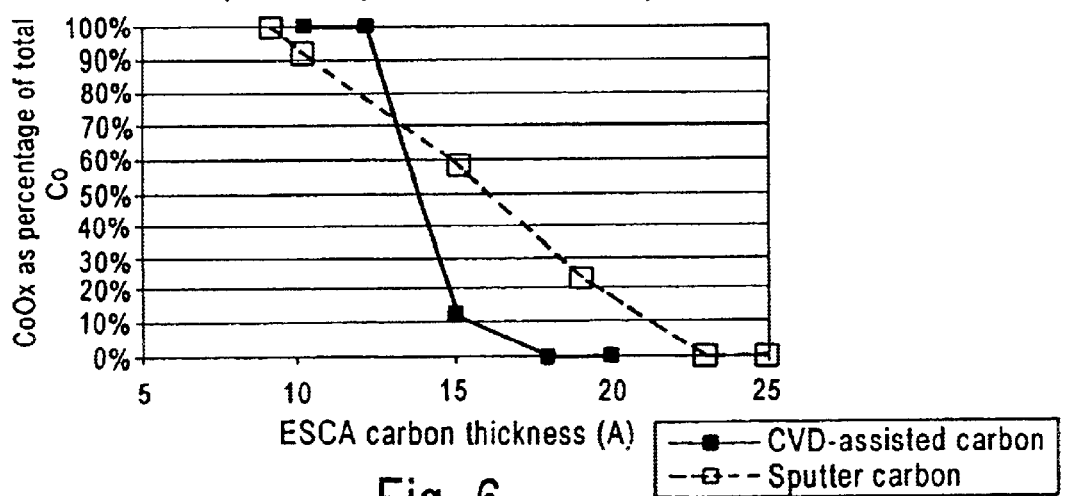
FIG. 6 is a graph for comparing the resistance to corrosion of Co films provided by C:H protective overcoat layers formed according to the simultaneous sputtering+PECVD method of the invention and by C:H protective overcoat layers formed according to conventional sputtering methodology, as a function of the thickness of the C:H protective overcoat layers.

FIG. 6 is a graph for comparing the resistance to corrosion of Co films provided by C:H protective overcoat layers formed according to the simultaneous sputtering+PECVD method of the invention and formed according to conventional sputtering methodology, as a function of the thickness of the C:H protective overcoat layers. The data points shown FIG. 6 were obtained in the following manner: High resolution ESCA spectra were taken over the Co(2p) regions in order to determine the oxidation state of the Co. The binding energies, chemical binding state assignments, and relative percentages of $CoO_x$ were determined for samples subjected to environmental stressing under an 80° C./80% RH (relative humidity) environment for 4 days. The ESCA measurements were conducted on samples with various C:H layer thicknesses. Below a critical thickness, the C:H films lost capability of protecting the underlying Co-containing ferromagnetic layer from oxidation, i.e., $CoO_x$ formation initiates. The critical thickness is useful measure of corrosion resistance of the film. Specifically, for a given C:H film thickness, a C:H film with a lower critical thickness provides greater corrosion/oxidation protection of the underlying Co film than a C:H film with a greater critical thickness. As is apparent from FIG. 6, the critical thickness for C:H films formed by the simultaneous sputter+PECVD method according to the present invention is 5 Å lower than that for conventional sputtered C:H films, indicating that the former C:H films provide a greater degree of corrosion protection to the underlying Co films than the latter C:H films.

Thus, the present invention provides a number of advantages over the conventional sputter-deposited C:H materials, films, and layers currently available for use as abrasion and corrosion-resistant protective overcoat layers for magnetic and MO recording media, such as hard disks. More specifically, the simultaneous sputter+PECVD-deposited C:H films according to the present invention provide enhanced corrosion resistance at ultra-thin thicknesses (i.e., ~30 Å), and thus are eminently suitable for use in the manufacture of very high areal recording density media and devices therefor requiring operation of read/write transducers at extremely low flying heights. In addition, the inventive means and methodology are fully compatible with all other aspects of automated manufacture of magnetic and MO media and are useful in a variety of other industrially significant applications, including, but not limited to, formation of hard, abrasion and corrosion resistant coatings useful in the manufacture of tools, bearings, turbines, etc.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A hard, abrasion and corrosion-resistant material useful as an ultra-thin protective overcoat layer for a magnetic or magneto-optical (MO) recording medium, which material comprises hydrogenated carbon (C:H) formed by a process comprising simultaneous sputter and plasma-enhanced chemical vapor (PECVD) deposition of said hydrogenated carbon (C:H), wherein the amount of carbon atoms in said C:H material derived from the PECVD component of said process is less than about 50 at. %.

2. The material according to claim 1, wherein the amount of carbon atoms in said C:H material derived from the PECVD component of said process is at least about 30 at. %.

3. The material according to claim 1, wherein the position of the Raman G-band of the C:H material is about 1553 $cm^{-1}$.

4. The material according to claim 1, wherein the film resistance of the C:H material is as high as about 85 k $\Omega$.

5. A magnetic or MO recording medium comprising a protective overcoat layer formed of the C:H material according to claim 1.

6. The medium according to claim 5, wherein the thickness of said protective overcoat layer is not greater than about 30 Å.

7. A recording medium, comprising:
   (a) a substrate;
   (b) a stack of thin film layers on said substrate; and
   (c) a protective overcoat layer on an uppermost layer of said stack of thin film layers, wherein:
   said protective overcoat layer comprises a hard, abrasion and corrosion-resistant material comprising hydrogenated carbon (C:H) formed by a process comprising simultaneous sputter and plasma-enhanced chemical vapor (PECVD) deposition of said hydrogenated carbon (C:H) material, wherein the amount of carbon atoms in said C:H material contributed by the PECVD component of said process is less than about 50 at. %.

8. The medium as in claim 7, wherein the amount of carbon atoms in said C:H material contributed by the PECVD component of said process is at least about 30 at. %.

9. The medium as in claim 7, wherein the position of the Raman G-band of the C:H material of said protective overcoat layer is about 1553 $cm^{-1}$ and the film resistance of said C:H material of said protective overcoat layer is as high as about 85 k $\Omega$.

10. The medium as in claim 7, wherein:
    said stack (b) of thin film layers comprises a stack of layers for a magnetic or magneto-optical (MO) recording medium.

11. The medium as in claim 10, wherein:
    said substrate (a) is disk-shaped.

12. The medium as in claim 10, wherein:
    said stack (b) of thin film layers comprises a stack of layers for a magnetic recording medium; and
    said protective overcoat layer (c) is not greater than about 30 Å thick.

13. The medium as in claim 12, wherein:
    said stack (b) of thin film layers includes at least one ferromagnetic layer comprising Co.

14. A magnetic recording medium, comprising:
    (a) at least one ferromagnetic thin film layer containing Co; and
    (b) means for protecting said at least one Co-containing ferromagnetic thin film layer from corrosion under high temperature, high humidity environments, comprising a layer of a hard, abrasion and corrosion-resistant material comprising hydrogenated carbon (C:H) formed by a process comprising simultaneous sputter and plasma-enhanced chemical vapor (PECVD) deposition of said hydrogenated carbon (C:H) material, wherein the amount of carbon atoms in said C:H material contributed by the PECVD component of said process is less than about 50 at. %.

* * * * *